United States Patent [19]

Iwamura

[11] Patent Number: 5,677,901
[45] Date of Patent: Oct. 14, 1997

[54] METHODS AND APPARTUS FOR REPRODUCING AND DECODING DATA RECORDED ON A DISK

[75] Inventor: Ryuichi Iwamura, Tokyo, Japan

[73] Assignee: Sony Corporation, Tokyo, Japan

[21] Appl. No.: 127,571

[22] Filed: Sep. 28, 1993

[30] Foreign Application Priority Data

Sep. 30, 1992 [JP] Japan .................................. 4-285475

[51] Int. Cl.$^6$ ........................................................ G11B 5/09
[52] U.S. Cl. ...................................................... 369/60; 369/54
[58] Field of Search ...................................... 369/54, 58, 60, 369/44.32, 44.28, 30, 32, 33, 50, 47, 48, 49, 53; 360/24, 27, 36.1, 36.2

[56] References Cited

U.S. PATENT DOCUMENTS

| | | |
|---|---|---|
| 4,998,252 | 3/1991 | Suzuki et al. . |
| 5,051,998 | 9/1991 | Murai et al. . |
| 5,471,450 | 11/1995 | Yonemitsu et al. ............... 369/58 |
| 5,517,477 | 5/1996 | Sako ............................... 369/60 |

FOREIGN PATENT DOCUMENTS

| | | |
|---|---|---|
| 0 260 722 | 3/1988 | European Pat. Off. . |
| 0 398 651 | 11/1990 | European Pat. Off. . |
| 0 468 646 | 1/1992 | European Pat. Off. . |
| 0 522 853 | 1/1993 | European Pat. Off. . |

OTHER PUBLICATIONS

Elektronik vol. 34, No. 21, Oct. 1985, Munchen DE pp. 81–88 Zeltwanger 'Chipsatze zur Ansteuerung von Winchesterlaufwerken' figure 2 (No Translation).

IEEE Transactions on Consumer Electronics vol. CE31, No. 1, Feb. 1985, New York US pp. 24–31 Ukai et al. 'Sound PCM decoder LSI's for Japanese DBS' par. 2; figure 4.

*Primary Examiner*—P. W. Huber
*Attorney, Agent, or Firm*—William S. Frommer; Alvin Sinderbrand

[57] ABSTRACT

The present invention relates to methods and apparatus for reproducing encoded data recorded on a disk and decoding the reproduced encoded data. The data reproduced from the disk in encoded form are stored in a buffer and read from the buffer for carrying out error correction. Once the data have been error-corrected, the error corrected encoded data are again stored in the buffer. Then the data are read from the buffer for decoding.

59 Claims, 8 Drawing Sheets

METHODS AND APPARTUS FOR REPRODUCING AND DECODING DATA RECORDED ON A DISK

BACKGROUND OF THE INVENTION

The present invention relates to methods and apparatus for reproducing encoded data from a disk and decoding the reproduced encoded data, such as methods and apparatus for reproducing and decoding video and/or audio signals recorded on disks such as optical disks and magneto-optical disks.

U.S. patent application Ser. No. 07/908,164, now U.S. Pat. No. 5,471,450 assigned the assignee of the present application, relates to devices for reproducing audio signals or animated picture signals recorded on a recording medium, such as an optical disk. Advantageously, the signals are compressed prior to recording by an image compression technique conforming to a standard, such as the MPEG standard established by the International Organization for Standardization (ISO) and the International Electrotechnical Commission (IEC).

FIG. 1 illustrates a reproducing device of a type to which U.S. patent application Ser. No. 07/908,164, now U.S. Pat. No. 5,471,450, relates. As shown in FIG. 1, a pickup 2 irradiates a laser beam onto an optical disk 1 to enable reproduction of video data recorded on the disk 1 from the reflected light. The pickup 2 converts the reflected light into image data which it supplies to a demodulation circuit 3 which demodulates the image data and supplies the same to a sector detection circuit 4 from which data, in turn, is supplied to an error correction circuit (ECC) 31 to carry out error detection and correction processes for the reproduced image data.

The sector detection circuit 4 detects the sector numbers, representing sector addresses of the data reproduced from the disk 1, which are included in the demodulated data and supplies the detected sector numbers to a control circuit 32. In the event that the sector detection circuit 4 is unable to detect the sector numbers which should be present in the demodulated data, or if the sector numbers as detected are not successive, the sector detection circuit 4 outputs an abnormal sector number signal to a track jump decision circuit 7.

The ECC 31 detects data errors in the received demodulated data and, if possible, corrects the detected errors with the use of parity data attached to the image data. In the event that an error in the data cannot be corrected, the ECC 31 outputs an error occurrence signal to the track jump decision circuit 7. After correction by the ECC, the data is supplied thereby to a ring buffer memory 5 where it is stored under the control of the control circuit 32.

The sector addresses of the data read from the optical disk 1 are read by the control circuit 32 from the output of the sector detection circuit 4 and, in response thereto, the control circuit 32 specifies a write address or write point (WP) for storing the corresponding data received from the ECC 31 in the ring buffer memory 5. In addition, the control circuit 32 specifies a read address or reproduction point (RP) of data written in the ring buffer memory 5 for reading data in response to a code request signal from a post-stage video code buffer 10 of a decoding section 20. The control circuit 32 reads the data at the specified reproduction point (RP) and supplies the same to the video code buffer 10 for storage therein.

The data stored in the video code buffer 10 is transferred thereby to an inverse variable length coding (IVLC) circuit 11 of the decoder section 20 in response to the code request signal which is produced by the IVLC circuit 11. The circuit 11 carries out inverse variable length coding of the data received from the video code buffer 10 and, when such processing is complete, supplies the resulting data to an inverse quantization circuit 12. At the same time, the IVLC circuit 11 outputs a further code request signal to the video buffer 10 for requesting a further supply of data therefrom. In addition, the IVLC circuit 11 outputs quantization step size data and a motion vector to an inverse quantization circuit 12 and a motion compensation circuit 15, respectively.

The circuit 12 carries out inverse quantization of the received data based on the quantization step size data and supplies the inverse quantized data to an inverse discrete cosine transformation (IDCT) circuit 13 for carrying out an inverse discrete cosine transformation process on the inverse quantized data which it then supplies to a first input of an adding circuit 14.

In the event that the data supplied from the IDCT circuit 13 is the data of an intraframe coded picture (also referred to as an I picture), the data supplied from the circuit 13 is output by the adding circuit 14 as is to be stored in one of a plurality of frame memories 16. Other pictures are encoded as "P pictures", that is, pictures encoded on a macroblock-by-macroblock basis selectively either by intraframe encoding or by interframe coding through prediction from one of a preceding or succeeding I picture or P picture. Where the data output by the circuit 13 is interframe coded P picture data, the decoded I picture or P picture data previously stored in one of the frame memories 16 is supplied thereby to a motion compensation circuit 15. The motion compensation circuit 15 carries out motion compensation of the received I picture or P picture data in response to corresponding motion vectors supplied by the IVLC circuit 11. The motion compensated data thus produced by the motion compensation circuit 15 is supplied thereby to a second input of the adding circuit 14 which adds the same to the data supplied from the IDCT circuit 13 in order to produce decoded P picture data. The decoded P picture data is also stored in one of the respective frame memories 16.

"B pictures" are encoded, macroblock-by-macroblock, selectively by one of intraframe coding, interframe coding based on the data of a single preceding or succeeding I picture or P picture, or through bidirectional coding (a predictive technique in which a given macroblock is predicted by combining the data of motion compensated macroblocks from two frames or fields encoded as I pictures or P pictures). Accordingly, to decode a B picture, data from one or both of the I picture and/or the P picture data stored in the frame memories 16 are read therefrom and supplied to the motion compensation circuit 15. After motion compensation by the circuit 15, the data are supplied to the second input of the adding circuit 14 which serves to add the data supplied from the IDCT circuit 13 with that received from the motion compensation circuit 15 to yield decoded B picture data. The decoded B picture data then is stored in a corresponding one of the frame memories 16. Finally, the stored picture data is read from the frame memories 16 to a digital-to-analog converter (D/A) 17 where it is converted to analog form and then supplied to a display 18 to produce visual images.

While the picture data and coding methods described above afford substantial compression of the data, the amount of data in a given frame or field can vary substantially from one frame or field to the next. For example, it is generally the case that frames or fields encoded as P pictures or B pictures have relatively less data than frames or fields encoded as I pictures. In addition, still pictures as well as pictures in which the luminance levels change very little over the spatial dimensions thereof (for example, pictures of a blue sky) typically yield relatively little data when encoded.

As mentioned above, the control circuit 32 supplies the data stored in the ring buffer memory 5 in response to the code request signal from the video code buffer 10. It will be appreciated that when the decoder 20 processes pictures for which relatively little data is required, the rate at which data will be requested by means of the code request signal produced by the IVLC circuit 11 will decrease so that the rate at which data is transferred to the video code buffer 10 from the ring buffer memory 5 likewise will decrease. Since, however, the data is reproduced at a substantially constant rate from the disk 1, the quantity of data stored in the ring buffer memory 5 will increase in these circumstances so that an overflow can result. In order to avoid such an occurrence, the tract jump decision circuit 7 determines the quantity of data currently stored in the ring buffer memory 5 by monitoring the write point (WP) and the reproduction point (RP) controlled by the control circuit 32. When the track jump decision circuit 7 detects that the quantity of data stored in the memory 5 has exceeded a preset reference value, indicating that the ring buffer memory 5 may overflow, the tract jump decision circuit 7 issues a track jump command to a tracking servo circuit 8.

In addition, when an abnormal sector number signal is supplied by the sector detection circuit 4 or an error occurrence signal from the ECC 31 is detected, the track jump decision circuit 7 likewise determines the quantity of the data remaining in ring buffer memory 5 again using the write point (WP) and the reproduction point (RP). The track jump decision circuit 7 also determines the quantity of data required to guarantee that sufficient data will be supplied from the ring buffer memory 5 to the video code buffer 10 so that pictures can be decoded without interruption if the circuit 7 commands a track jump, since the supply of new data from the optical disk 1 will be delayed thereupon as the disk 1 rotates another turn after the track jump until it arrives again at a position at which data is written. If there is a sufficiently large amount of data remaining in the ring buffer memory 5 when a track jump is to be made, underflow will not occur in the ring buffer memory 5 even if data is read from the memory 5 at a maximum transfer rate. If the foregoing conditions are satisfied, the track jump decision circuit 7 determines that the errors can be recovered by once again reproducing data from the error occurrence position by means of the pickup 2 and, therefore, outputs a track jump command to the tracking servo circuit 8.

When a track jump command is supplied from the track jump decision circuit 7 to avoid a potential overflow of memory 5, the tracking servo circuit 8 causes the pickup 2 to jump to the immediately preceding track. That is, where the disk being reproduced has recorded data sequentially from a track at its internal circumference to a track at its outer circumference, the tracking servo circuit 8 will cause the pickup 2 to jump from a current track to the adjacent track in the direction of the internal circumference. After the track jump, writing of new data in the ring buffer memory 5 is prohibited as the optical disk 1 rotates a full turn and until the reproduction position of the pickup 2 returns to the position from which the jump occurred which is detected when the sector number obtained from the sector detection circuit 4 corresponds with the sector number at the time of the track jump. As the pickup 2 proceeds toward the jump point, the data stored in the ring buffer memory 5 is transferred to the video code buffer 10 as needed.

After a track jump and a return of the pickup 2 to the point from which the jump occurred as indicated by the detected sector number, the quantity of data stored in the memory 5 may still exceed the specified reference value. If so, the possibility of overflow in the ring buffer memory 5 is indicated and, consequently, the writing of data in the memory 5 is suspended while a further track jump is executed.

The data capacity of the ring buffer memory 5 is selected so that the memory 5 is capable of storing an amount of data which is at least as much as the maximum amount of data reproduced during one turn of the optical disk 1. Therefore, where the disk to be reproduced is a constant linear velocity (CLV) disk for which the duration of the rotation cycle is greatest at the outermost circumference, the ring buffer memory 5 is selected so that it has a capacity to store the amount of data that would be reproduced during one turn of the disk at its outermost circumference. This amount of data would be equal to (a) the duration of a rotation cycle of the disk when data is reproduced from its outermost circumference, multiplied by (b) the data transfer rate from the ECC 31 to the ring buffer memory 5.

Moreover, the maximum transfer rate of the data from the ring buffer memory 5 to the video code buffer 10 is selected at a value equal to or less than the rate of data transfer from the ECC 31 to the ring buffer memory 5. In this manner, the video code buffer 10 may supply data transfer requests to the ring buffer memory 5 without regard to the occurrence or timing of a track jump.

Since track jumps are initiated in response to a determination whether a sufficient amount of data is stored in the ring buffer memory 5, the occurrence of overflow or underflow of the video code buffer 10 may be prevented regardless of the complexity or evenness of the picture data reproduced from the optical disk 1. Accordingly, pictures of uniform picture quality can be reproduced over a relatively long period of time. Further, degradation of picture quality due to data reading errors is alleviated since the system is provided with a track jump capability to enable the disk to be reread at a position where a read error occurred.

With reference to FIG. 2, the ECC 31 is illustrated therein having an input to receive data supplied by the demodulation circuit 3 of FIG. 1 via the sector detection circuit 4 which the circuit 31 stores temporarily in an input stage buffer 41. The data stored in the buffer 41 is transferred sequentially to a memory 42 where it is stored at addresses generated by an address generator 43. The data stored in the memory 42 is then read therefrom and transferred to an error correction circuit 44 which carries out error correction processing on the received data and then stores the corrected data in the memory 42.

FIG. 3 provides a memory map of the memory 42 for use in explaining the writing and reading of data to and from the memory 42. The data are received by the memory 42 in units of a predetermined data length and stored thereby at addresses indicated by a write pointer wp1 in the horizontal direction as indicated in the memory map of FIG. 3. Each of the data units includes parity bits added to the end of each data unit and stored in the memory 42 in the positions indicated by the crosshatched portion of FIG. 3. However, the parity bits are generated from diagonally aligned data bits (as shown in the memory map of FIG. 3) so that the parity bits produced for each set of diagonally aligned data bits are also aligned therewith. The diagonal alignment of the data and the parity bits produced therefrom is referred to herein as the "interleave" direction which is indicated by the dashed lines in FIG. 3.

The parity bits provide the ability to correct data errors in the data from which they were produced. Because of the arrangement of the data and corresponding parity bits in the interleave direction, burst errors can be isolated more effectively. After the data has been written at the addresses indicated by the write pointer wp1, they are read subsequently in the interleave direction from a position indicated by a read pointer rp1. It will be seen from FIG. 3 that the read pointer rp1 is delayed sufficiently with respect to the write pointer wp1 so that a complete line of interleaved data may be read for error correction processing. This delay must take account of the interleave length corresponding with the vertical extent of each interleaved data unit as indicated in FIG. 3. The data read from the addresses indicated by the read pointer rp1 are supplied to the error correction circuit 44 which carries out error correction processing and then returns the corrected data to the memory 42.

The data which have been corrected by the error correction circuit 44 are written in the same locations of the memory 42 at which they were stored upon transfer thereto from the buffer 41, as indicated by a write pointer wp2. Accordingly, the interval represented by the difference between the read pointer rp1 and write pointer wp2 corresponds with the ECC process time. After the corrected data have been rewritten at the locations indicated by the write pointer wp2, the data is transferred to an output buffer 45 of the error correction circuit 31 in accordance with a read pointer rp2 which designates each horizontal line of the error corrected data to be read. Accordingly, as time progresses, the read pointer rp2 is shifted vertically to sequentially output the corrected data to the buffer 45 to complete each cycle of operation of the ECC 31.

From the foregoing it will be appreciated that the corrected data is first stored in the memory 42 of FIG. 2 and then stored again in the ring buffer memory 5 after output from ECC 31. Consequently, in the device of FIG. 1, redundant operations are carried out, including the sequential input and output of data to and from the memories 42 and 5. It will thus be seen that the optical disk device of FIG. 1 is thus relatively complex and expensive as a result of the need for the memory 42.

OBJECTS AND SUMMARY OF THE INVENTION

It is an object of the present invention to provide methods and apparatus which alleviate the foregoing shortcomings and disadvantages of existing techniques.

It is another object of the present invention to provide methods and apparatus for reproducing and decoding data recorded on a disk which are relatively less complex and less expensive to implement than existing techniques.

In accordance with an aspect of the present invention, a method for reproducing encoded data recorded on a disk and decoding the reproduced encoded data comprises the steps of: reproducing the encoded data from the disk; storing the reproduced encoded data in a first buffer; reading the reproduced encoded data from the first buffer; correcting errors in the reproduced encoded data read from the first buffer to produce error-corrected encoded data; storing the error-corrected encoded data in the first buffer; reading the error-corrected encoded data from the first buffer at a variable rate; and decoding the error-corrected encoded data read from the first buffer at said variable rate.

In accordance with another aspect of the present invention, an apparatus for reproducing encoded data recorded on a disk and decoding the reproduced encoded data comprises: reproduction means for reproducing the encoded data recorded on the disk; storage means for storing the reproduced encoded data; error correction means for correcting errors in the reproduced encoded data; decoder means for decoding encoded data supplied thereto; and read/write control means for controllably writing the reproduced encoded data in said storage means, reading the reproduced encoded data from the storage means to the error correction means, writing error-corrected encoded data from the error correction means in the storage means and reading the error-corrected encoded data from the storage means for supply to said decoder means at a variable rate.

In accordance with a further aspect of the present invention a method for reproducing encoded data recorded on a disk and decoding the reproduced encoded data with the use of a decoder, comprises the steps of: reproducing the encoded data from the disk; storing the reproduced encoded data in a first buffer; reading the reproduced encoded data from the first buffer; correcting errors in the reproduced encoded data read from the first buffer to produce error-corrected encoded data; storing the error-corrected encoded data in the first buffer; producing a data request signal representing a request by the decoder for provision of the error-corrected encoded data thereto for decoding; reading the error-corrected encoded data from the first buffer in response to the data request signal; and decoding the error-corrected encoded data read from the first buffer.

In accordance with yet another aspect of the present invention, an apparatus for reproducing encoded data recorded on a disk and decoding the reproduced encoded data, comprises: reproducing means for reproducing the encoded data recorded on the disk; storage means for storing the reproduced encoded data; error correction means for correcting errors in the reproduced encoded data; decoder means for decoding encoded data supplied thereto; and read/write control means for controllably writing the reproduced encoded data in said storage means, reading the reproduced encoded data from the storage means to the error correction means and writing error-corrected encoded data from the error correction means in the storage means; the decoder means being operative to produce a data request signal representing a request by the decoder for provision of the error-corrected encoded data thereto for decoding; the read/write control means being operative to read the error-corrected encoded data from the storage means for supply to the decoder means in response to the data request signal.

In accordance with a still further aspect of the present invention, a method for reproducing encoded data recorded in tracks in a predetermined data order according to a predetermined track sequence on a disk and decoding the reproduced encoded data, comprises the steps of: reproducing encoded data from a current track of the disk and a track preceding the current track in said predetermined track sequence to provide first reproduced encoded data; storing the first reproduced encoded data in a first buffer; after providing the first reproduced encoded data, track jumping from the current track to the preceding track; reproducing encoded data from the preceding track after track jumping thereto to provide second reproduced encoded data corresponding with at least a portion of the first reproduced encoded data; storing the second reproduced encoded data in the first buffer; reading at least a portion of each of the first and second reproduced encoded data from the first buffer; correcting errors in said at least a portion of each of the first and second reproduced encoded data read from the first buffer to produce error-corrected encoded data; storing the error-corrected encoded data in the first buffer; reading the error-corrected encoded data from the first buffer such that data in a first portion hereof corresponding with the first reproduced encoded data are read from the first buffer in said predetermined data order with data in a second portion of the error-corrected encoded data corresponding with the first reproduced encoded data; and decoding the error-corrected encoded data read from the first buffer.

In accordance with yet still another aspect of the present invention, an apparatus for reproducing encoded data recorded in tracks in a predetermined data order according to a predetermined track sequence on a disk and decoding the reproduced encoded data, comprises: reproduction means for reproducing encoded data from respective tracks on the disk; storage means for storing the reproduced encoded data; track jump control means for controlling the reproducing means to track jump from a current track from which data is being reproduced thereby to a preceding track in said predetermined track sequence for reproducing data the therefrom; error correction means for correcting errors in the reproduced encoded data; decoder means for decoding encoded data supplied thereto; and read/write control means for writing encoded data reproduced from the current track and the preceding track to a track jump as first reproduced encoded data in said storage means and writing encoded data reproduced from the preceding track after said track jump as second reproduced encoded in said storage means; said read/write control means being operative to read at least a portion of each of the first and sec reproduced encoded data from the storage means to the error correction means and to write error-corrected first reproduced encoded data and error-corrected second reproduced encoded data in the storage means; said read/write control means being further operative to read the error-corrected first and second reproduced encoded data from the storage means to the decoder means such that the error corrected first reproduced encoded data are read from the storage means in said predetermined order said error corrected second reproduced encoded data.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 4:
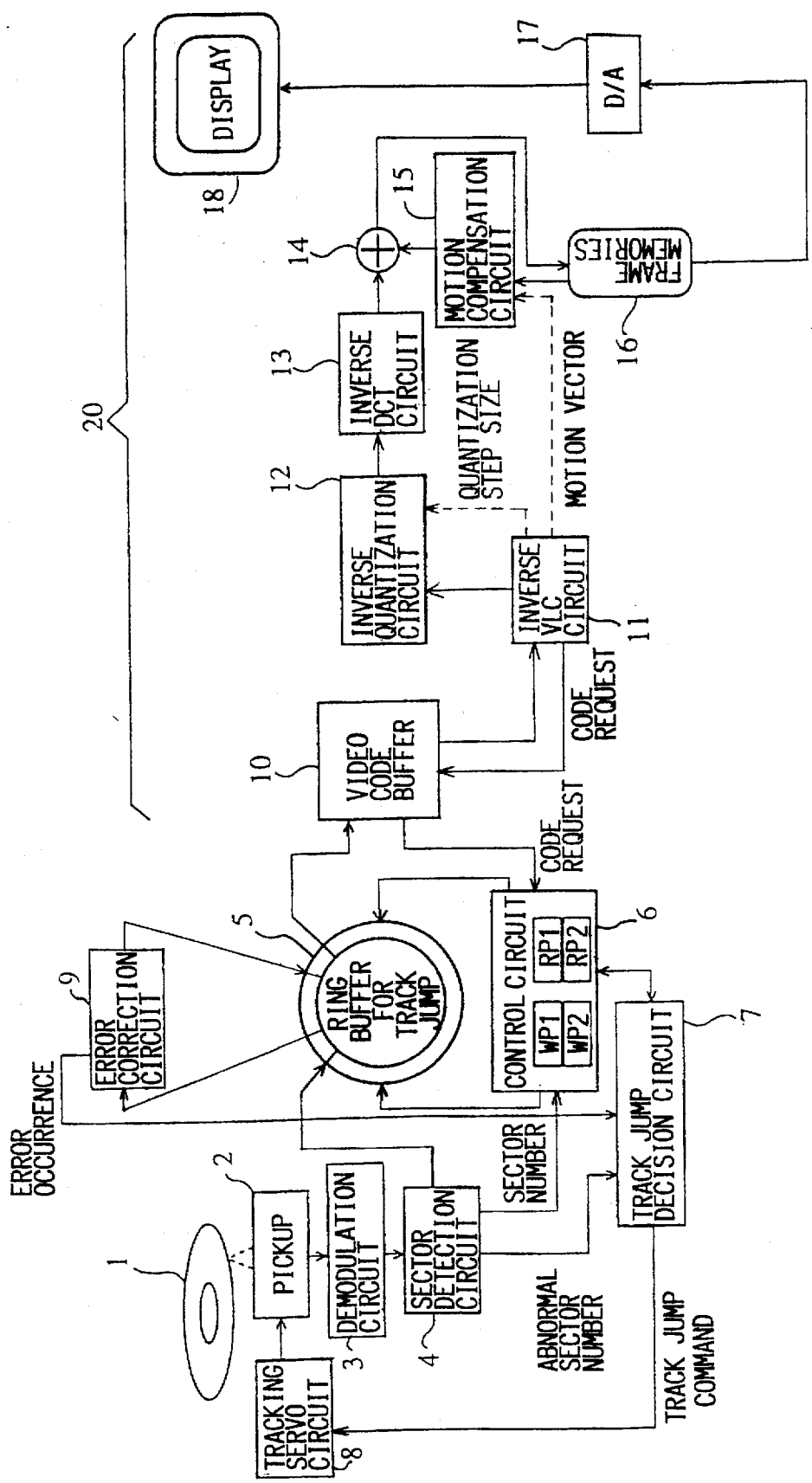
FIG. 4 is a block diagram of an optical disk reproducing system in accordance with an embodiment of the present invention.

With reference now to FIG. 4, a block diagram of an optical disk reproducing system according to an embodiment of the present invention is illustrated therein in which pickup 2 reproduces predictively encoded picture data from an optical disk 1 and supplies the same to a demodulation circuit 3 which demodulates the reproduced data. The circuit 3 supplies the demodulated data in turn to a sector detection circuit 4 for detecting sector numbers included in the demodulated picture data. Picture data then is output by the sector detection circuit for storage in a ring buffer memory 5. Memory 5 may be implemented, for example, in the form of DRAM or SRAM circuitry; however, other devices suitable for implementing the ring buffer memory 5 will be apparent based on the disclosure of the present application.

A control circuit 6 receives sector numbers detected by the sector detection circuit 4 to determine the addresses of the data reproduced from the optical disk 1 and being supplied for storage in the ring buffer memory 5. The control circuit 6 responds to the sector numbers by specifying a write address or write point (WP1) an stores the picture data supplied by the sector detection circuit 4 at the specified addresses of the ring buffer memory 5. The write addresses are arranged numerically in sequence and, except as explained hereinbelow, the control circuit 6 selects a write address for each item of data so that the data are written in numerically sequential memory addresses in the ring buffer memory 5 in the same order as the data are normally reproduced from the disk 1, that is, successively in the sequence as recorded thereon.

In addition, the control circuit 6 specifies a read address or reproduction point (RP2) for the data stored in the ring buffer memory in response to the receipt of a code request signal from a post-stage video code buffer 10 of a decoder section 20 which serves to decode predictively encoded picture data. The control circuit 6 reads the data specified by the reproduction point (RP2) from the memory 5 for storage in the video code buffer 10 from which the stored data is, in turn, supplied pursuant to the code request signal to an IVLC circuit 11 for inverse variable length coding. The IVLC circuit 11 supplies inverse variable length coded picture data as well as quantization step size data and motion vectors for subsequent decoding processing in the same manner as the circuit of FIG. 1. IVLC circuit 11 supplies the data request signal to the video code buffer 10 as data are required for decoding. It will be appreciated that the rate at which data will thus be requested by the circuit 11 will depending on the type of picture being decoded and the nature of the image data. In turn, the data request signal supplied to the control circuit 6 from the buffer 10 will reflect the over time of the data supply rate requirement of the decoder section 20.

The read addresses specified by the control circuit 6 are also arranged numerically in sequence and, except as explained hereinbelow, the control circuit 6 specifies the read address for each data unit so that the data are read from numerically sequential memory addresses to supply the data to the video code buffer 10 in the same order as normally reproduced from (and as record, on) the disk 1. The control circuit 6 also specifies a further read address or reproduction point (RP1) for reading data stored the ring buffer memory 5 for supply to an error correction circuit (ECC) 9 for carrying out error correction thereof, well as a further write address or write point (WP2) for error corrected data supplied by the error correction circuit 9 in the ring buffer memory 5.

Figure 5:
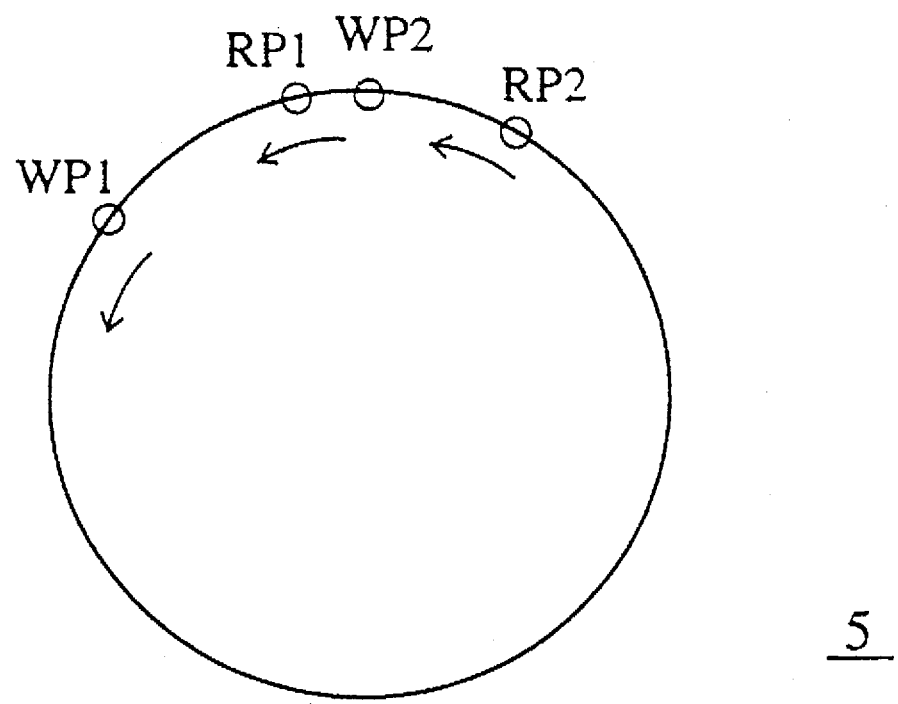
FIG. 5 is a schematic diagram for use in explaining the operation of a ring buffer memory of the FIG. 4 system.

With reference now to FIG. 5, the relationship of the numerical addresses "positions" of the write points WP1 and WP2 and reproduction points RP1 and RP2 of the ring buffer memory 5 are illustrated therein. The addresses represented by the write and reproduction points WP1, WP2, RP1 and RP2 are constrained so that will overtake another, but will "rotate" in the counterclockwise or forward direction as illustrated in FIG. 5 (as indicated by the arrows therein) as time progresses, except as explained below.

Figure 1:
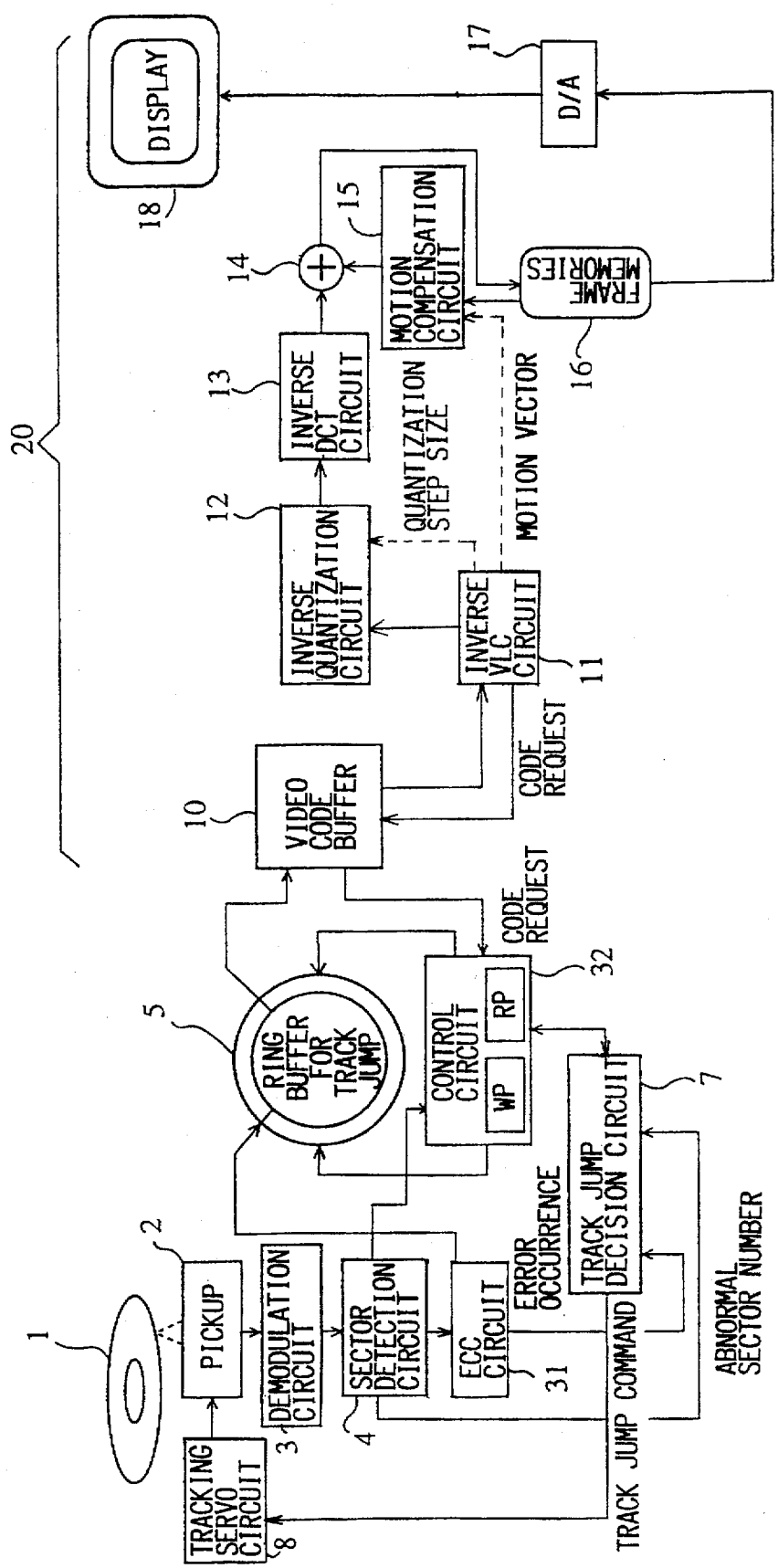
FIG. 1 is a block diagram of a proposed optical disk reproducing system.
Figure 2:
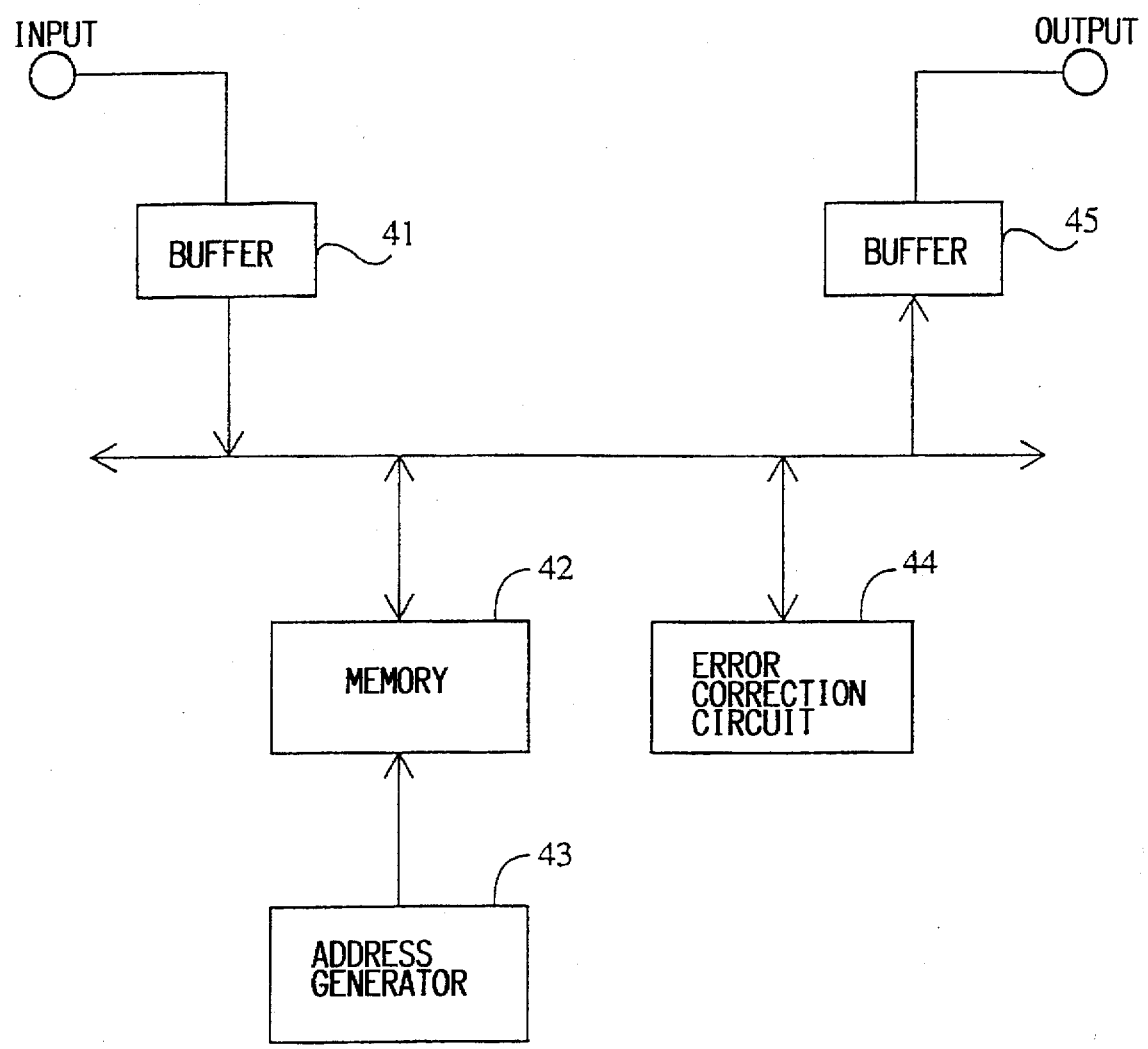
FIG. 2 is a block diagram of an error correction circuit (ECC) of the optical disk reproducing system of FIG. 1.
Figure 3:
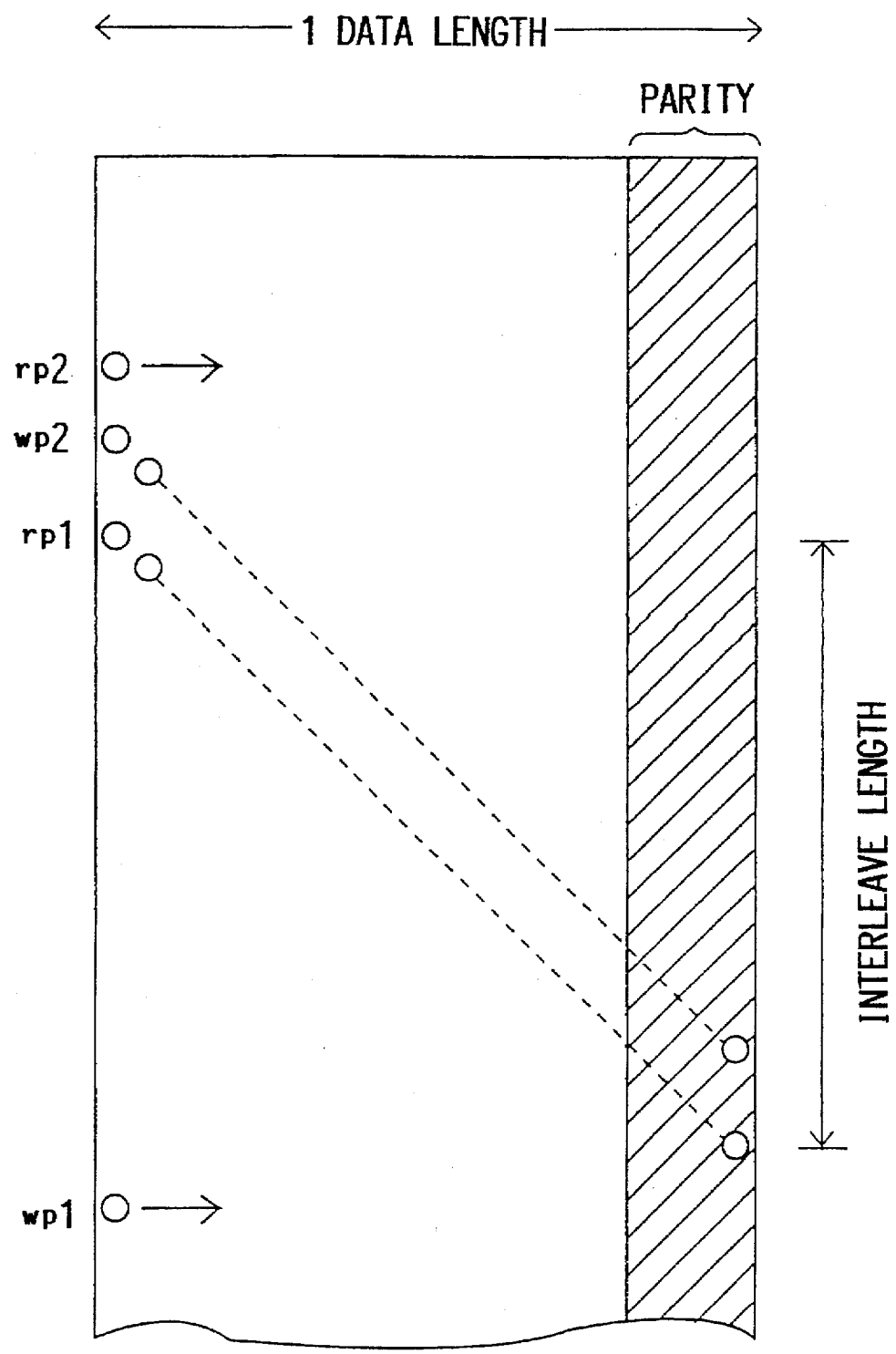
FIG. 3 is a memory map for illustrating the operation of a memory included in the ECC of FIG. 2.

The ECC 9 FIG. 4 is substantially simplified as compared with the EC 31 of FIG. 1 since the memory 42 of circuit 31 is not required by the ECC 9. Rather, data is read to the ECC 9 from the reproduction point RP1 of the ring buffer memory 5 and the ECC 9 carries error correction processing with the use of the error correction parity data read with each group of data (or "data unit") supplied from the memory 5. The error corrected data is output by the ECC 9 and stored in the ring buffer memory 5 at the write point WP2. In the event that an error in the group of data supplied to ECC 9 cannot be corrected thereby, it outputs an error occurrence signal to a track jump decision circuit 7. It will be appreciated from the foregoing that, in a normal sequence of operation, data is first written at the write point WP1 of the ring buffer memory 5 and thereafter read when the reproduction point RP1 advances to the address of its data unit for processing by the error correction circuit 9. The processing delay introduced by the error correction circuit 9 corresponds in time with the spacing of the reproduction point RP1 and write point WP2, so that when the circuit 9 is ready to return error corrected data to the memory 5, the write point WP2 corresponds with the original addresses from which the corresponding corrected data were read from the memory 5. After the corrected data written in the ring buffer memory 5 and the reproduction point RP2 advances to its memory address, the data is read from the ring buffer memory 5 in response to a code request signal from the video code buffer 10 to be stored therein and subsequently read therefrom for decoding as discussed above.

A more detailed explanation of certain operational features of the FIG. 4 embodiment is now provided. The track jump decision circuit 7 on an ongoing basis determines the quantity of the error corrected data stored in the ring buffer memory 5 which is, thus, available for supply to the video code buffer 10, by determining the difference between the address indicated by the write point WP2 and the address indicated by the reproduction point RP2. Based on the determined quantity, the track jump decision circuit supplies a track jump command to a tracking servo circuit 8 in the same manner as in the device of FIG. 1, when there is the risk of an overflow in the ring buffer memory 5 or when an abnormal sector number is detected by the sector detection circuit 4.

When a track jump is executed under the control of the track jump decision 7, the control circuit 6 serves to control the write points WP1 and WP2 as well as the reproduction points RP1 and RP2 in the manner described below in connection with FIGS. 6–9.

Figure 6:
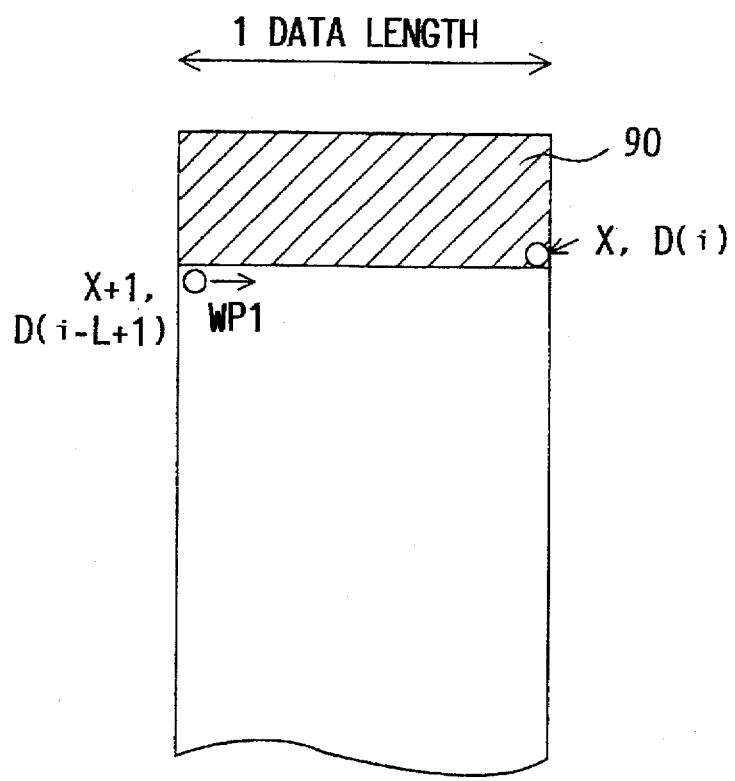
FIGS. 6 through 9 are memory maps for use in illustrating the operation of the ring buffer memory of the FIG. 4 system.

FIG. 6 provides a memory map for illustrating the state of the ring buffer memory 5 after a track jump and upon the resumption of the writing of data in the memory 5 following its interruption. In FIGS. 6–9 it is assumed that the interleave length is equal to L and in FIG. 6, error corrected data up to and including data D (i) has been stored sequentially up to address X in the cross-hatched portion 90, wherein i is an index which increases by 1 for each item of data in the sequence as normally reproduced from the disk 1. Accordingly, the data up to and including data D (i) may be output from the ring buffer 5 to the video code buffer 10 for decoding. After the track jump, the writing of data output from the demodulation circuit 3 through the sector detection circuit 4 is resumed from address X+1 indicated by the write point WP1 once the pickup 2 has again reproduced the data D(i–L+1) preceding the data D(i) which is detected from the sector data output by the sector detection circuit 4.

Figure 7:
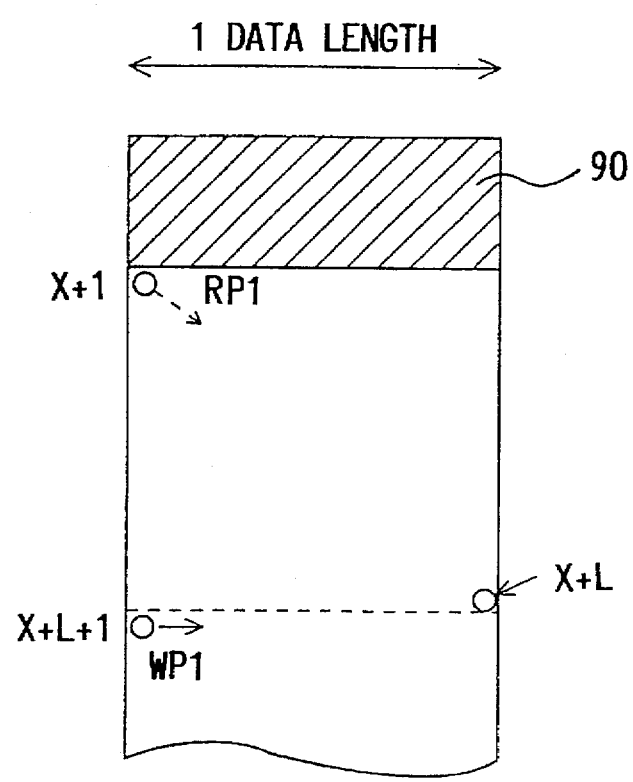

As illustrated in FIG. 7, after writing is resumed following the track jump, once the address indicated by the write point WP1 advances to (X+L+1) so that the data from D(i–L+1) to D(i) have been written in the ring buffer 5 from address X+1 to address X+L, the read point RP1 is set to X+1. Then, error correction processing is resumed by reading the data in the interleave direction from X+1 as indicated by the read point RP1 to the error correction circuit 9. It should be noted that, since the data D(i–L+1) was written at the address X+1 upon resumption of the data D(i+1) will be written at address (X+L+1). When correction processing is thus carried out and the error data is resupplied to the ring buffer memory 5 for therein, the error corrected data is initially stored at address X+1 as the initial value of the write point WP2. Thereafter, the error corrected data is rewritten sequential from the address X+1 as indicated in FIG. 8, so that after error correction the data is returned to the positions at which it was written originally upon receipt from the sector detection circuit 4.

Track jumping is carried out only when the amount of error corrected data stored in the ring buffer memory 5 is sufficient to ensure that data can continue to be read as needed to the video code buffer 10, so that the reproduction point RP2 can be sequentially increased incrementally without interruption in response to code request signals supplied by the video code buffer 10, as is case in normal operation.

Figure 8:
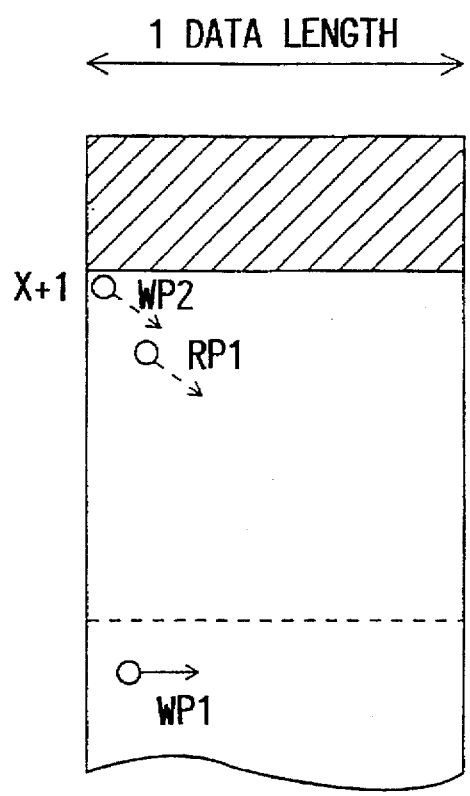
Figure 9:
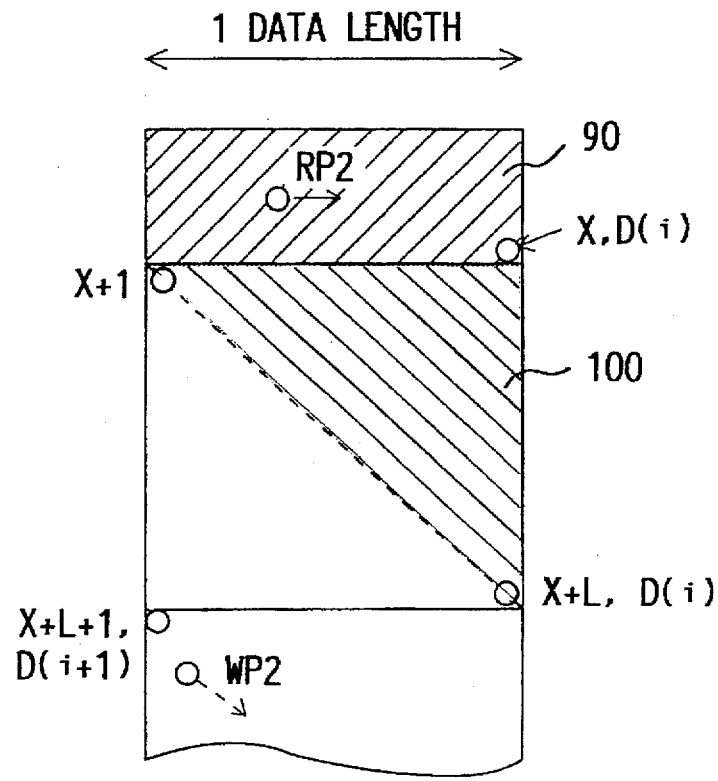

Since the stored from address X+1 forward is discontinuous with data stored up to address X, and error correction is carried out by reading data in the interleave direction as illustrated, for example, in FIG. 8, the data stored in the portion 100 FIG. 9 cannot be error corrected in this particular embodiment. In addition, as explained previously data is read from the buffer memory 5 to the video code buffer 10 in units of one data length in the horizontal direction as illustrated in FIG. 9. Accordingly, the data extending from address X+1 to address X+L is not supplied to the decoder since it has not been error corrected in its entirety.

Consequently, once the reproduction point RP2 reaches address X, the control circuit 6 responds by storing an address X+L in its place before the next read cycle commences. As a result, in the next read cycle when the address is incremented by 1, the reproduction point RP2 jumps from address X to address X+L+1. As noted above, after a track jump the writing of data in the ring buffer memory 5 is resumed from a position slightly before the original position of the pickup 2 at the time of the track jump in order to commence storing the data D(i–L+1), rather than the data D(i+1). In this manner, despite the occurrence of a track jump, the data reproduced from the optical disk 1 is written in the ring buffer memory 5 such that the error-corrected data stored at address X immediately precedes the error-corrected data stored at address X+L+1 in the data sequence as normally reproduced from the disk 1, so that a continuous data stream of error-corrected data can be output from the ring buffer memory 5 when the reproduction point RP2 jumps from X to X+L+1.

It will seen that the ring buffer memory 5 thus serves a dual purpose of preventing overflow and underflow of data in the video de buffer 10 and serving as a means to permit the data to be stored for purposes of reading the same in the interleave direction for carrying out error correction in the ECC 9. Accordingly, system can be implemented in a smaller size and less expensively since the need for a separate ECC memory has been eliminated in system of FIG. 4.

As noted above, when an uncorrectable error in the data is encountered (which may be due, for example, to mechanical vibration), the ECC 9 provides an error occurrence signal to the track jump decision circuit 7. In that event, the track jump decision circuit 7 determines the quantity of the error corrected data remaining in the ring buffer memory 5 based on the write point WP2 and the reproduction point RP2 from the control circuit 6 to determine whether a track jump may be carried out.

Figure 10:
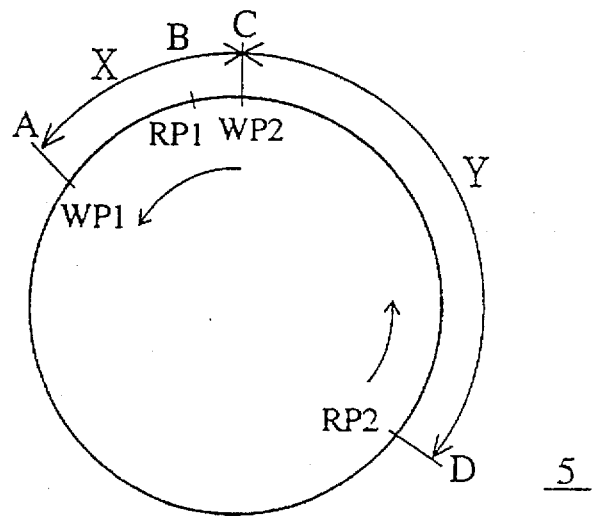
FIGS. 10 through 12 are schematic diagrams for use in illustrating the operation of the ring buffer memory of the FIG. 4 system when uncorrectable data errors are encountered.

The operation of the track jump decision circuit 7 is illustrated in greater detail in connection with FIG. 10 which schematically illustrates the relationship of the write points WP1 and WP2 and reproduction points RP1 and RP2 in the ring buffer memory 5. The positions of the points WP1, RP1, WP2 and RP2 are indicated, respectively, by address points A, B, C and D in FIG. 10. In the of FIG. 10, it is assumed that an uncorrectable error has occurred in the data between the reproduction point RP1 and the write point WP2, so that the track jump decision circuit 7 determines the amount of data remaining in the ring buffer 5 between addresses WP2 (point C) and RP2 (point D) which indicated by the quantity Y.

The quantity of error corrected data $\alpha$ that is required to ensure that error corrected data may be read from the ring buffer memory 5 to the video code buffer 10 during a single rotation of the optical disk 1 is determined by multiplying the period of the rotation by the highest bit rate from the ring buffer memory 5 to the video code buffer 10. In addition, the quantity of data stored in the ring buffer memory 5 and which has not been subjected to error correction, and which is indicated by the data quantity X in FIG. 10 between the write point WP1 and the write point WP2, is also determined. Then, the sum of these data quantities ($\alpha$+X) is compared with the data quantity Y. When the data quantity Y exceeds the data quantity ($\alpha$+X), the track jump decision circuit 7 determines that an underflow of data in the ring buffer memory 5 will not occur as data is read from the memory 5 to the vide code buffer 10 despite the interruption caused by a track jump, and accordingly, the track jump decision circuit 7 responds to the error occurrence signal by issuing a track jump command to the tracking servo circuit 8. The tracking servo circuit 8 responds to the track jump command by causing the pickup 2 to jump from the current track to the next preceding track which has already been reproduced, and the pickup 2 commences reproduction of data from the next preceding track once the track jump has been executed. It will be appreciated that a multiple track jump nay also be executed if sufficient data is stored in the memory 5.

Figure 11:
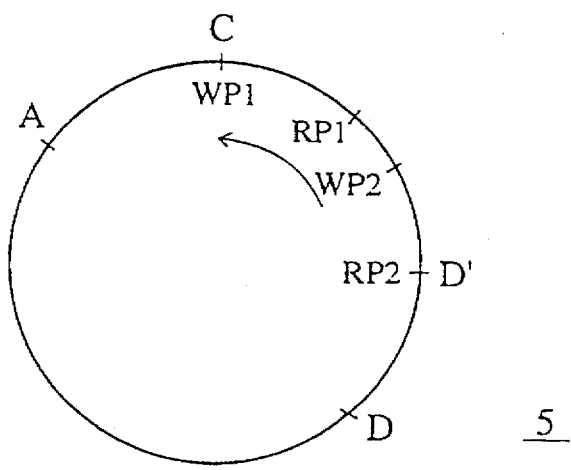
Figure 12:
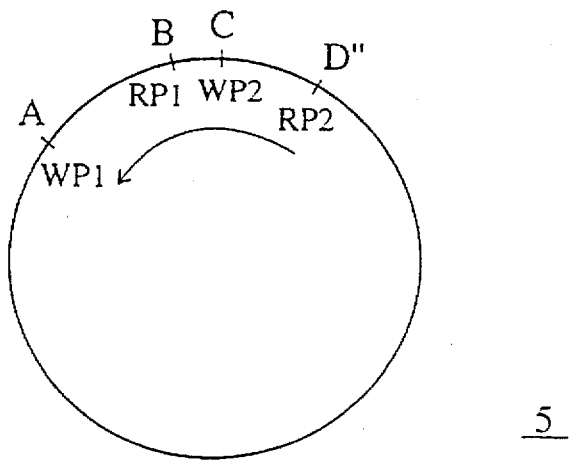

In addition, when an error occurrence signal is output by the ECC 9 and the track jump occurs, as illustrated in FIG. 11 the control circuit moves the address of the write point WP1 in the reverse direction from address point A to address point C, and also moves the reproduction point RP1 and the write point WP2 in the reverse direction as illustrated in FIG. 11 by an identical number of address locations. Thereafter, once the pickup 2 arrives at the location of the data which could not be error corrected, the data is again written in the ring buffer memory 5 from the address indicated by the write point WP1.

It will be appreciated that, from the instance of the track jump until the pickup again reaches the position of the data to be written from address point C, as indicated by the write point WP1, the reproduction point RP2 advances in the forward direction as indicated in FIG. 11 from the point D so that error data can be provided as needed to the decoder 20 in order to provide an interrupted output of decoded picture data. The progression of the write point RP2 from the address point D the occurrence of the track jump and until the pickup 2 arrives at the data to be written from the address point C brings the reproduction point RP2 to the address point D' as illustrate in FIG. 11. Since the quantity of error corrected data Y stored in the ring buffer memory 5 between the write point WP2 and the reproduction point RP2 exceeds the quantity of data $\alpha$+X (which, as explained above, is a pre-condition for a track jump), it will be appreciated that the reproduction point RP2 will not pass the write point WP2 despite the backward shift of the write point WP2 (as indicated by FIGS. 10 and 11) and the delay in rewriting data from the address point C as discussed above. Accordingly, the observance of the pre-condition that the data quantity Y exceeds the data quantity $\alpha$+X ensures that underflow will not occur in the ring buffer memory 5. Moreover, if at least one track portion of error corrected data is stored in the ring buffer memory 5 when an error occurrence signal is output by the ECC 9, the data which could not be error corrected can be recovered by again reproducing this data from the optical disk 1 through a track jump of the pickup 2 without interrupting the data decoding process.

Although an embodiment of the present invention has been described herein for use in reproducing data from an optical disk, the present invention is also applicable for reproducing data from other disk storage devices, such as magneto-optical disks and magnetic disks. When employed for reproducing data recorded in tracks on a magnetic disk, the pickup 2 is replaced by a suitable magnetic reproducing head and processing circuitry adapted to process signals reproduced by the magnetic head is employed. Moreover, although the embodiment of the present invention disclosed herein carries out error correction in interleaved units as illustrated, for example, in FIGS. 6–9, the present invention is also useful for applications in which error correction processing is carried out on data units arranged in other formats.

Although specific embodiments of the invention have been described in detail herein with reference to the accompanying drawings, it is to be understood that the invention is not limited to such embodiments, and that various changes and modifications may be effected therein by one skilled in the art without departing from the scope or spirit of the invention as defined in the appended claims.

What is claimed is:

1. A method for reproducing encoded data recorded in tracks in a predetermined data order according to a predetermined track sequence on a disk and decoding the reproduced encoded data, comprising the steps of:

reproducing encoded data from a current track of the disk and a track preceding the current track in said predetermined track sequence to provide first reproduced encoded data;

storing the first reproduced encoded data in a first buffer;

after providing the first reproduced encoded data, track jumping from the current track to the preceding track;

reproducing encoded data from the preceding track after track jumping thereto to provide second reproduced encoded data corresponding with at least a portion of the first reproduced encoded data;

storing the second reproduced encoded data in the first buffer;

reading at least a portion of each of the first and second reproduced encoded data from the first buffer;

correcting errors in said at least a portion of each of the first and second reproduced encoded data read from the first buffer to produce error-corrected encoded data;

storing the error-corrected encoded data in the first buffer;

reading the error-corrected encoded data from the first buffer such that data in a first portion thereof corresponding with the first reproduced encoded data are read from the first buffer in said predetermined data order with data in a second portion of the error-corrected encoded data corresponding with the first reproduced encoded data; and decoding the error-corrected encoded data read from the first buffer.

2. The method of claim 1, wherein the step of track jumping comprises detecting an uncorrectable error in the first reproduced encoded data and initiating said track jump in response to the detection of such uncorrectable error.

3. The method of claim 1, wherein the step of track jumping comprises detecting a potential data overflow of said first buffer and initiating said track jump in response to the detection of said potential data overflow.

4. The method of claim 1, wherein the step of track jumping comprises detecting an abnormal sequence of sector numbers included in the first reproduced encoded data and initiating said track jump in response to the detection of the abnormal sequence of the detected sector numbers.

5. The method of claim 1, wherein the step of track jumping comprises determining whether a predetermined minimum quantity of error-corrected encoded data is stored in the first buffer as a precondition to a track jump.

6. The method of claim 1, wherein the track preceding the current track is arranged adjacent said current track on the disk.

7. The method of claim 1, wherein the step of reproducing encoded data to provide the first reproduced encoded data comprises reproducing the encoded data in a data reproduction sequence, the step of storing the first reproduced encoded data comprises storing the first reproduced encoded data in first write addresses in the first buffer selected in a data storage order corresponding with the data reproduction sequence, the step of reading the error-corrected encoded data comprises reading the first portion thereof from the first buffer in a first read sequence corresponding with the data storage order and from first read addresses each following a contemporaneous first write address, the step of reading a portion of the first reproduced encoded data comprises reading reproduced encoded data units each from at least one second read address of the first buffer following a contemporaneous first write address and preceding a contemporaneous first read address, and the step of storing the error-corrected encoded data comprises storing error-corrected encoded data units each in at least one second write address following an at least one second read address at which a data unit is contemporaneously read and preceding a contemporaneous first read address.

8. The method of claim 7, wherein the first buffer comprises a ring buffer memory.

9. The method of claim 7, wherein the step of storing error-corrected encoded data units comprises storing each respective one of the error-corrected encoded data units at addresses of said first buffer from which a corresponding data unit was read and error-corrected to produce said each respective one of the error-corrected encoded data units.

10. The method of claim 7, wherein the steps of storing the first reproduced encoded data in first write addresses and reading the first portion of the error-corrected encoded data from first read addresses comprise storing the first reproduced encoded data and reading the first portion of the error-corrected encoded data successively to numerically sequential first write addresses and from numerically sequential first read addresses, respectively.

11. The method of claim 7, wherein the steps of reproducing encoded data to provide the first and second reproduced encoded data comprise reproducing the encoded data in data units each including primary data bits and error correction parity data bits, each of the error correction parity data bits of each data unit being produced as one of a plurality of error correction parity data bits each included in a respectively different data unit from a corresponding plurality of primary data bits each included in a respectively different data unit other than the data units including said plurality of parity data bits, each plurality of error correction parity data bits and corresponding plurality of primary data bits forming an error correction data unit, the step of reading at least a portion of the first and second reproduced encoded data comprises reading reproduced encoded data units from a plurality of second read addresses such that each of the reproduced encoded data units includes a corresponding error correction data unit, and the step of storing the error-corrected encoded data units comprises storing each of the error-corrected encoded data units in a plurality of second write addresses such that at least some of the plurality of second write addresses include uncorrected data.

12. The method of claim 11, wherein the step of reproducing encoded data to provide the second reproduced encoded data comprises reproducing a sufficient amount of data corresponding with data included in said first portion of the error corrected encoded data to ensure that said second portion of the error-corrected encoded data may be read in said predetermined data order with said first portion of the error-corrected encoded data.

13. The method of claim 1, wherein the steps of reproducing encoded data comprise reproducing the encoded data from an optical disk.

14. The method of claim 1, wherein the steps of reproducing encoded data comprise reproducing the encoded data from a magneto-optical disk.

15. The method of claim 1, wherein the steps of reproducing encoded data comprise reproducing the encoded data from a magnetic disk.

16. The method of claim 1, wherein the steps of reproducing encoded data comprise reproducing picture data from the disk.

17. The method of claim 16, wherein the steps of reproducing encoded data comprise reproducing predictively encoded picture data from the disk.

18. The method of claim 1 further comprising the step of continuously reproducing the encoded data from the disk after the track jump to the preceding track and until the encoded data of the current track is reproduced, thereby completing a track jump operation, wherein said step of reading at least a portion of the first and second reproduced encoded data from the first buffer is performed during said track jump operation.

19. An apparatus for reproducing encoded data recorded in tracks in a predetermined data order according to a predetermined track sequence on a disk and decoding the reproduced encoded data, comprising:

reproduction means for reproducing encoded data from respective tracks on the disk;

storage means for storing the reproduced encoded data;

track jump control means for controlling the reproducing means to track jump from a current track from which data is being reproduced thereby to a preceding track in said predetermined track sequence for reproducing data therefrom;

error correction means for correcting errors in the reproduced encoded data;

decoder means for decoding encoded data supplied thereto; and read/write control means for writing encoded data reproduced from the current track and the preceding track prior to a track jump as first reproduced encoded data in said storage means and writing encoded data reproduced from the preceding track after said track jump as second reproduced encoded data in said storage means;

said read/write control means being operative to read at least a portion of each of the first and second reproduced encoded data from the storage means to the error correction means and to write error-corrected first reproduced encoded data and error-corrected second reproduced encoded data in the storage means;

said read/write control means being further operative to read the error-corrected first and second reproduced encoded data from the storage means to the decoder means such that the error corrected first reproduced encoded data are read from the storage means in said predetermined order with said error corrected second reproduced encoded data.

20. The apparatus of claim 19, wherein the track jump control means is operative to detect an uncorrectable error in the reproduced encoded data and to control the reproducing means to track jump in response to the detection of such uncorrectable error.

21. The apparatus of claim 19, wherein the track jump control means is operative to detect a potential data overflow of said storage means and to control the reproducing means to track jump in response to the detection of such potential data overflow.

22. The apparatus of claim 19, wherein the track jump control means is operative to detect an abnormal sequence of sector numbers in the reproduced encoded data and to control the reproducing means to track jump in response to said detection of said abnormal sequence of sector numbers.

23. The apparatus of claim 19, wherein the track jump control means is operative to determine whether a predetermined minimum data quantity of error-corrected encoded data is stored in the storage means as a precondition to a track jump.

24. The apparatus of claim 19, wherein the track jump control means is operative to control the reproducing means to track jump from the current track to the next preceding track in said predetermined track sequence.

25. The apparatus of claim 19, wherein the read/write control means is operative to write the first reproduced encoded data at first write addresses in the storage means selected in a data storage order corresponding with the predetermined data order;

said read/write control means being further operative to read the error-corrected first reproduced encoded data from the storage means in a first read sequence corresponding with the data storage order and from first read addresses each following a contemporaneous first write address;

said read/write control means being further operative to read said at least a portion of the first reproduced encoded data from the storage means to the error correction means in data units each from at least one second read address of the storage means following a contemporaneous first write address and proceeding a contemporaneous first reed address and to store the error-corrected first reproduced encoded data in error-corrected data units each in at least one second write address following an at least one second read address at which a data unit is contemporaneously read and preceding a contemporaneous first read address.

26. The apparatus of claim 25, wherein the storage means comprises a ring buffer memory.

27. The apparatus of claim 25, wherein the read/write control means is operative to store each respective one of the error-corrected first reproduced encoded data units at addresses of the storage means from which a corresponding unit of the first reproduced encoded data was read to the error correction means to produce said each respective one of the error-corrected first reproduced encoded data units.

28. The apparatus of claim 27, wherein the read/write control means is operative to write the first reproduced encoded data and read the error-corrected first reproduced encoded data from the storage means successively to numerically sequential first write addresses and from numerically sequential first read addresses, respectively.

29. The apparatus of claim 19, wherein said storage means is operative to store an amount of the reproduced encoded data at least equal to the largest amount of encoded data stored in a single track of the disk.

30. The apparatus of claim 19, wherein said storage means is operative to store an amount of the error-corrected first and second reproduced encoded data at least equal to the largest amount of data stored in a single track of the disk.

31. The apparatus of claim 19, wherein the reproduction means is operative to reproduce encoded data from an optical disk.

32. The apparatus of claim 19, wherein the reproducing means is operative to reproduce encoded data from a magneto-optical disk.

33. The apparatus of claim 19, wherein the reproduction means is operative to reproduce encoded data from a magnetic disk.

34. The apparatus of claim 19, wherein the decoder means is operative to decode encoded picture data supplied thereto from the storage means.

35. The apparatus of claim 34, wherein the decoder means is operative to decode predictively encoded picture data supplied thereto from the storage means.

36. The apparatus of claim 19 further comprising means for continuously reproducing the encoded data from the disk after the track jump to the preceding track and until the encoded data of the current track is reproduced, thereby completing a track jump operation, wherein said read/write control means reads at least a portion of the first and second reproduced encoded data from the storage means to the error correction means during said track jump operation.

37. A method for reproducing encoded data from a preceding track of a disk after a track jump occurs during reproduction of a current track and decoding the reproduced encoded data with the use of a decoder, comprising the steps of:

reproducing the encoded data from the current track of said disk;

storing the reproduced encoded data from the current track in a first buffer;

track jumping to a preceding track when a track error occurs;

reproducing the encoded data from the preceding track;

storing the reproduced data from the preceding track in said first buffer;

reading the reproduced encoded data from the first buffer;

correcting errors in the reproduced encoded data of the current and preceding tracks read from the first buffer to produce error-corrected encoded data;

storing the error-corrected encoded data in the first buffer;

producing a data request signal representing a request by the decoder for provision of the error-corrected encoded data thereto for decoding;

reading the error-corrected encoded data from the first buffer in response to the data request signal; and decoding the error-corrected encoded data read from the first buffer.

38. The method of claim 37, wherein the step of decoding the error-corrected encoded data comprises storing the error-corrected encoded data read from the first buffer in a second buffer, reading the error-corrected encoded data from the second buffer and decoding the error-corrected encoded data read from the second buffer.

39. The method of claim 38, wherein the step of producing a data request signal comprises supplying the data request signal from the second buffer.

40. The method of claim 37, wherein the step of reproducing the encoded data comprises reproducing the encoded data from an optical disk.

41. The method of claim 37, wherein the step of reproducing the encoded data comprises reproducing the encoded data from an magneto-optical disk.

42. The method of claim 37, wherein the step of reproducing data comprises reproducing the encoded data from a magnetic disk.

43. The method of claim 37, wherein the step of reproducing the encoded data comprises reproducing encoded picture data from a disk, and the step of decoding the error-corrected encoded data comprises decoding error-corrected encoded picture data.

44. The method of claim 43, wherein the step of reproducing encoded picture data comprises reproducing predictively encoded picture data from the disk, and the step of decoding the error-corrected encoded picture data comprises decoding error-corrected predictively encoded picture data.

45. The method of claim 37 further comprising the steps of:

track jumping from a current track from which the encoded data is currently reproduced to another track in response to a track error occurrence during reproduction of the encoded data on the current track; and continuously reproducing the encoded data from the disk after the track jump to said another track and until the encoded data from the current track is reproduced, thereby completing a track jump operation, wherein said step of reading the reproduced encoded data from the first buffer is performed during said track jump operation.

46. An apparatus for reproducing encoded data from a preceding track of a disk after a track jump occurs during reproduction of a current track recorded on said disk and decoding the reproduced encoded data, comprising:

reproducing means for reproducing the encoded data recorded on the disk;

storage means for storing the reproduced encoded data from the current track and from the preceding track when a track jump occurs;

error correction means for correcting errors in the reproduced encoded data of the current and preceding tracks;

decoder means for decoding encoded data supplied thereto; and read/write control means for controllably writing the reproduced encoded data in said storage means, reading the reproduced encoded data from the storage means to the error correction means and writing error-corrected encoded data from the error correction means in the storage means;

the decoder means being operative to produce a data request signal representing a request by the decoder for provision of the error-corrected encoded data thereto for decoding;

the read/write control means being operative to read the error-corrected encoded data from the storage means for supply to the decoder means in response to the data request signal.

47. The apparatus of claim 46 further comprising:

means for track jumping from a current track from which the encoded data is currently reproduced to another track in response to a track error occurrence during reproduction of the encoded data on the current track; and means for continuously reproducing the encoded data from the disk after the track jump to said another track and until the encoded data of the current track is reproduced, thereby completing a track jump operation, wherein said read/write control means reads the reproduced encoded data from the storage means to the error correction means during said track jump operation.

48. A method for reproducing encoded data from a preceding track of a disk after a track jump occurs during reproduction of a current track recorded on said disk and decoding the reproduced encoded data, comprising the steps of:

reproducing the encoded data from the disk;

storing the reproduced encoded data from the current track and from the preceding track in a first buffer when a track jump occurs;

reading the reproduced encoded data from the first buffer;

correcting errors in the reproduced encoded data of the current and preceding tracks read from the first buffer to produce error-corrected encoded data;

storing the error-corrected encoded data in the first buffer;

reading the error-corrected encoded data from the first buffer at a variable rate; and decoding the error-corrected encoded data read from the first buffer at said variable rate.

49. The method of claim 48, wherein the step of reproducing the encoded data comprises reproducing encoded picture data from said disk.

50. The method of claim 49, wherein the step of reproducing encoded picture data comprises reproducing predictively encoded picture data.

51. The method of claim 48, wherein the step of decoding the error-corrected encoded data comprises storing the error-corrected encoded data read from the first buffer in a second buffer, reading the error-corrected encoded data from the second buffer and decoding the data read from the second buffer.

52. The method of claim 48, wherein the step of reproducing the encoded data comprises reproducing encoded data from an optical disk.

53. The method of claim 48, wherein the step of reproducing the encoded data comprises reproducing encoded data from a magneto-optical disk.

54. The method of claim 48, wherein the step of reproducing the encoded data comprises reproducing encoded data from a magnetic disk.

55. The method of claim 48 further comprising the steps of:

track jumping from a current track from which the encoded data is currently reproduced to another track in response to a track error occurrence during reproduction of the encoded data on the current track; and continuously reproducing the encoded data from the disk after the track jump to said another track and until the encoded data of the current track is reproduced, thereby completing a track jump operation, wherein said step of reading the reproduced encoded data from the first buffer is performed during said track jump operation.

56. An apparatus for reproducing encoded data from a preceding track of a disk after a track jump occurs during reproduction of a current track recorded on said disk and decoding the reproduced encoded data, comprising:

reproduction means for reproducing the encoded data recorded on the disk;

storage means for storing the reproduced encoded data from the current track and from the preceding track when a track jump occurs;

error correction means for correcting errors in the reproduced encoded data of the current and preceding tracks;

decoder means for decoding encoded data supplied thereto; and read/write control means for controllably writing reproduced encoded data from a preceding track in said storage means when a track jump occurs, reading the reproduced encoded data from the storage means to the error correction means, writing error-corrected encoded data from the error correction means in the storage means and reading the error-corrected encoded data from the storage means for supply to said decoder means at a variable rate.

57. The apparatus of claim 56, wherein the read/write control means is operative to read the error-corrected encoded data from the storage means for supply to the decoder means at a rate varying according to a variable data supply rate requirement of said decoder means.

58. The apparatus of claim 57, wherein the read/write control means is operative to read the error-corrected encoded data from the storage means for supply to the decoder means at said rate varying according to said variable data rate requirement in response to a data request signal supplied by said decoder means.

59. The apparatus of claim 56 further comprising:

means for track jumping from a current track from which the encoded data is currently reproduced to another track in response to a track error occurrence during reproduction of the encoded data on the current track; and means for continuously reproducing the encoded data from the disk after the track jump to said another track and until the encoded data of the current track is reproduced, thereby completing a track jump operation, wherein said read/write control means reads the reproduced encoded data from the storage means to the error correction means during said track jump operation.

* * * * *